US008478650B2

(12) United States Patent
Ridley et al.

(10) Patent No.: US 8,478,650 B2
(45) Date of Patent: Jul. 2, 2013

(54) METHOD AND APPARATUS FOR DISPLAYING SEARCH RESULTS WHILE PREPARING A MEDIA PLAN

(75) Inventors: Steven Ridley, New York, NY (US); David Steigelfest, New York, NY (US); Brad Briggs, London (GB); Jerod Clabaugh, Brooklyn, NY (US); Jeremy O'Brien, New York, NY (US)

(73) Assignee: Poster Publicity, Inc., New York, NY (US)

( * ) Notice: Subject to any disclaimer, the term of this patent is extended or adjusted under 35 U.S.C. 154(b) by 119 days.

(21) Appl. No.: 12/798,539

(22) Filed: Apr. 6, 2010

(65) Prior Publication Data

US 2011/0010385 A1    Jan. 13, 2011

Related U.S. Application Data

(60) Provisional application No. 61/211,985, filed on Apr. 6, 2009.

(51) Int. Cl.
*G06Q 30/00*        (2012.01)

(52) U.S. Cl.
USPC .......................... 705/26.1; 705/27.1; 705/14.1

(58) Field of Classification Search
USPC ............................ 705/26, 27, 26.1, 27.1, 14.1
See application file for complete search history.

(56) References Cited

U.S. PATENT DOCUMENTS

| | | | |
|---|---|---|---|
| 6,985,882 B1 | 1/2006 | Del Sesto | |
| 2002/0095391 A1 | 7/2002 | Swart | |
| 2004/0122735 A1 | 6/2004 | Meshkin | |
| 2004/0192437 A1 | 9/2004 | Amaitis | |
| 2005/0256766 A1 | 11/2005 | Garcia et al. | |
| 2006/0282314 A1 | 12/2006 | Zamanian et al. | |
| 2007/0033104 A1 | 2/2007 | Collins | |
| 2007/0219857 A1 | 9/2007 | Seymour et al. | |
| 2007/0265933 A1 | 11/2007 | Steigelfest | |
| 2008/0235590 A1* | 9/2008 | Krantz et al. | 715/730 |
| 2008/0306804 A1 | 12/2008 | Opdycke et al. | |
| 2009/0144144 A1* | 6/2009 | Grouf et al. | 705/14 |

OTHER PUBLICATIONS

Dietrich, Heidi, Ad HAWKS, Puget Sound Business Journal23. 12 (Jul. 26, 2002): 28, downloaded from ProQuestDirect on the Internet on Feb. 7, 2013, 3 pages.*

* cited by examiner

*Primary Examiner* — James Zurita
(74) *Attorney, Agent, or Firm* — Davidson, Davidson & Kappel, LLC

(57) ABSTRACT

A method and apparatus for displaying search results while generating a media campaign from information about available units stored in a central database, including a set of media formats for the available units and associated ancillary information. Selective criteria is entered at a remote computer coupled to the central computer database via a network and web server for a search of the information stored in the database, and a search is generated based upon the selective criteria. Results of the search are displayed at the remote computer, the results constituting matching media format information and associated ancillary information the results displayed according to the associated ancillary information, which preferably constitutes time periods for which the corresponding formats are available. The search results are preferably displayed in a timeline, preferably organized in daily or weekly views.

20 Claims, 19 Drawing Sheets

BEHAVIOR & MEDIA VIEW | LIFELINE VIEW
SHOW ALL | SHOW FILTERED & SELECTED ONLY | SHOW SELECTED ONLY
FILTERS  RESET ALL | SAVE | LOAD | SUBMIT
▼ MEDIA FILTERS

| MEDIA CATEGORY | MEDIA TYPE | MEDIA FORMAT | MEDIA VENDOR | QUALITY OF EXPOSURE <**** | TIME OF EXPOSURE <***** | MEDIA ASSOCIATIONS | TRADITIONAL ☐ | NON-TRADITIONAL ☐ | DIGITAL ☐ | NON-DIGITAL ☐ |

PRINT ⇵ SELECT...

▲ AWAY FROM HOME - SHOPPING    152    WEEKLY VIEW ⇵
▲ AWAY FROM HOME - PERSONAL TIME    154    WEEKLY VIEW ⇵
▼ TRAVEL    146    DAILY VIEW ⇵   [M][T][W][TH][F][SA][SU]

06:00  07:00  08:00  09:00  10:00  11:00  12:00  13:00  14:00  15:00  16:00  17:00  18:00  19:00  20:00  21:00  22:00  23:00  24:00
                                                                                  10%   7%

|  | MEDIA FORMAT HIT BY BEHAVIOR | OTHER HIT BEHAVIOR | WITH BEHAVIOR OVERLAPS | QUALITY OF EXPOSURE | TIME OF EXPOSURE | DAILY VIEW ⇵ [M][T][W][TH][F][SA][SU] | VENDORS | WITH PLANTS | UNITS |
|---|---|---|---|---|---|---|---|---|---|
| ☐ ▼ BUS | 3/10 | 1/1 | 2/3 |  |  |  |  |  |  |
| MEDIA CATEGORY | 1/2 MEDIA TIME | 2/2 MEDIA FORMAT |  |  |  |  | 3/5 | 3/4 | 78/120 |
| ▼ TRANSIT MEDIA | MEDIA TYPE | 1/1 MEDIA FORMAT |  |  |  |  | 2/4 | 2/3 | 120/170 |
| | ▶ TRAINS, SUBWAY, TROLLEY | MEDIA FORMAT | 1/1 | 2 | **** | **** | 2/4 | 2/3 | 128/170 |
| | | ▲ BRANDED CAR (FULL) ☐ TRADITIONAL MEDIA NON-DIGITAL | 1/3 | 0 | **** | **** | 1/1 | 1/1 | 78/120 |
| | | ▲ RAIL CLOOCKS ☐ TRADITIONAL MEDIA NON-DIGITAL |  |  |  |  | 0/2 | 0/8 | 0/0 |

FIG. 6(Cont.)

| | 06:00 | 07:00 | 08:00 | 09:00 | 10:00 | 11:00 | 12:00 | | | 1/2 | 1/2 | 50/50 |
|---|---|---|---|---|---|---|---|---|---|---|---|---|
| ▲ PLATFORM BANNER | | | | | | | | | | | | |
| ▲ TRADITIONAL MEDIA \| NON-DIGITAL | | | | | | | | | | | | |
| CLEAR CHANNEL | ⊙ | ☐ | | | | | ★★★★ | 0 | BILL PECKINPAW BPECKINPAW@CLEARCHANNEL.COM +1 212 659 5662 JESUS MORENO JMORENO@CLEARCHANNEL.COM +1 212 659 5662 | | | 50/50 |
| CBS OUTDOOR | ⊙ | ☐ | | | | | | ★★★★ | BILL PECKINPAW BPECKINPAW@CLEARCHANNEL.COM +1 212 659 5662 JESUS MORENO JMORENO@CLEARCHANNEL.COM +1 212 659 5662 | | | 50/50 |

NYC MTA - 34TH ST/PENN STATIONS ⊙ ☐ 34TH STREET @ PENN STATION (SW ENTRANCE) PRINTED - LARGE FORMAT -- EXTERIOR

06:00 07:00 08:00 09:00 10:00 11:00 12:00 13:00 14:00 15:00 16:00 17:00 18:00 19:00 20:00 21:00 22:00 23:00 24:00

☐ ▲ BICYCLE

| MEDIA FORMAT HIT BY BEHAVIOR | 3/10 | WITH BEHAVIOR OVERLAPS | 10% | 7% | 2/3 | DAILY VIEW ⇄ | M T W TH F SA SU |
|---|---|---|---|---|---|---|---|

CAMPAIGN PLAN TOTALS

| NUMBER OF BEHAVIORS HIT | BEHAVIOR FREQUENCIES PER WEEK (AVERAGE) | MEDIA FORMAT | BEHAVIOR FREQUENCIES PER WEEK (MEDIAN) | MEDIA EXPOSURE FREQUENCY PER WEEK (AVERAGE) | MEDIA EXPOSURE FREQUENCY PER WEEK (MEDIAN) |
|---|---|---|---|---|---|
| 10/19 | 70X/WK | | 56X/WK | 723/WK | 560X/WK |

| MEDIA CATEGORY | MEDIA TYPE | MEDIA FORMAT | AVERAGE QUALITY OF EXPOSURE | AVERAGE TIME OF EXPOSURE | VENDORS WITH PLANS | UNITS |
|---|---|---|---|---|---|---|
| 3/5 | 12/27 | 28/58 | ★★★☆ | ★★★☆ | 27/56 | 13/46 | 758/1230 |

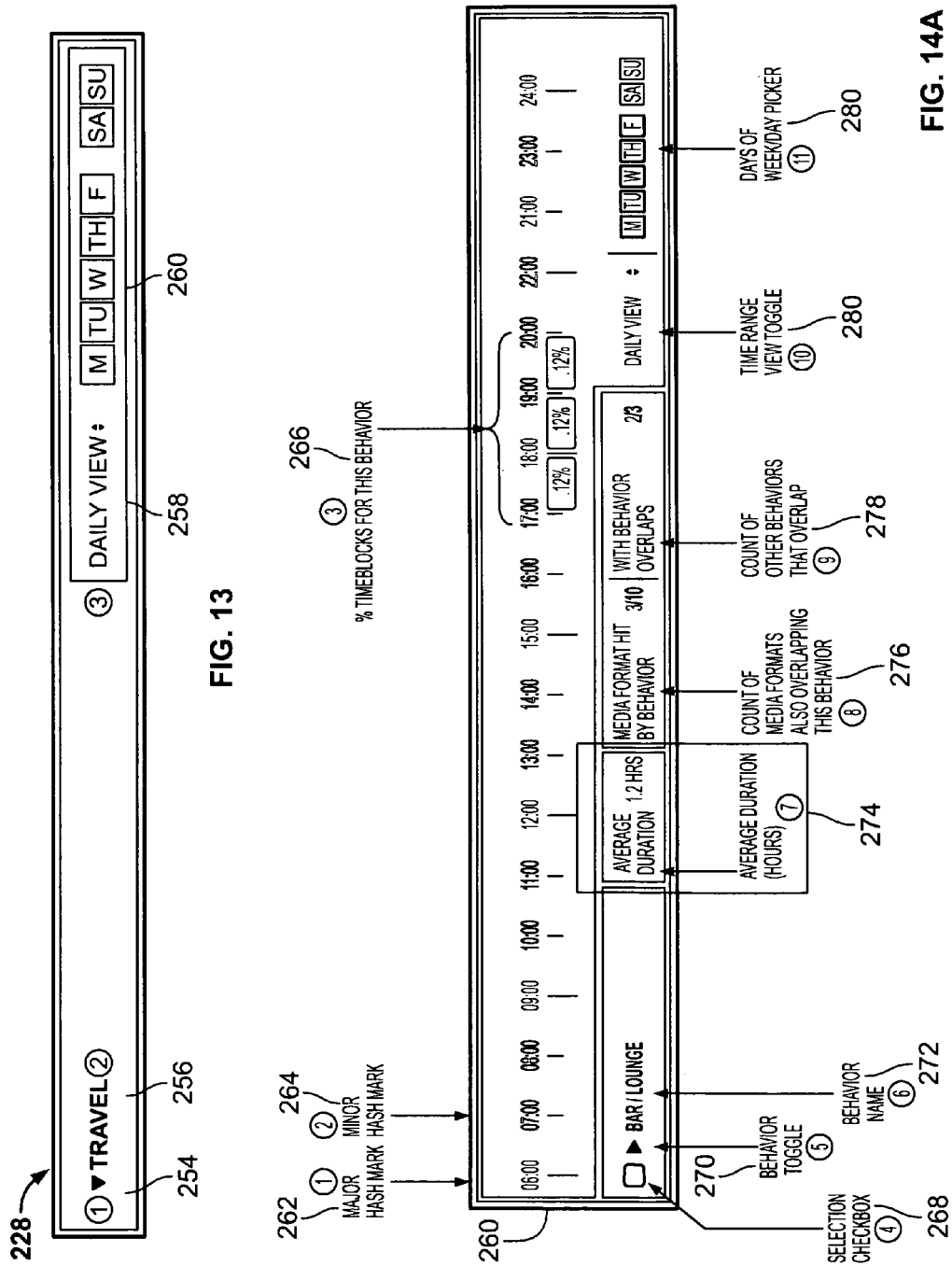

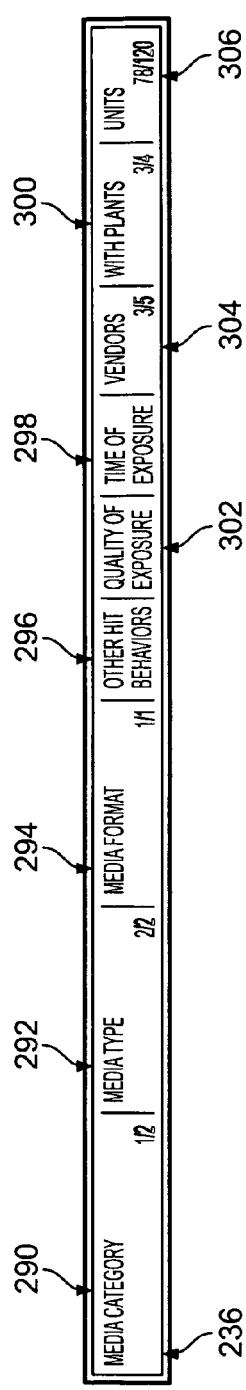
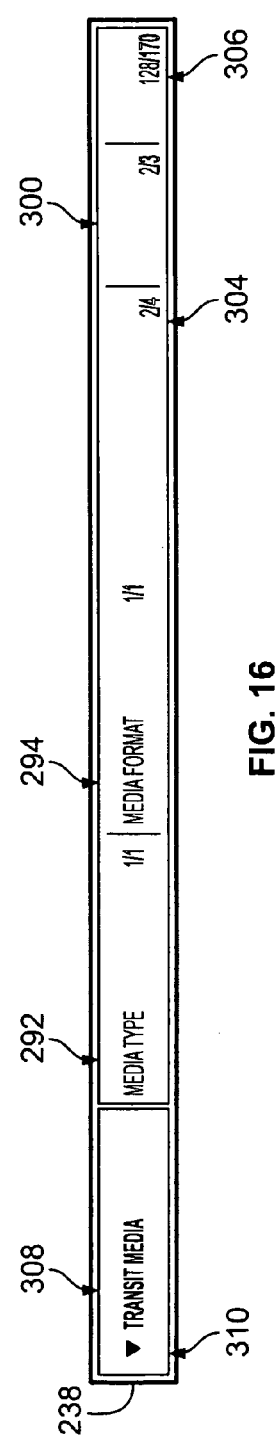
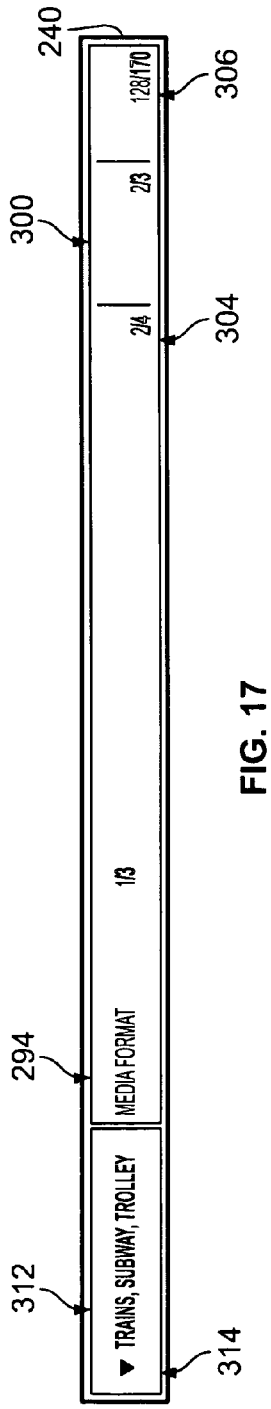
FIG. 15
FIG. 16
FIG. 17

METHOD AND APPARATUS FOR DISPLAYING SEARCH RESULTS WHILE PREPARING A MEDIA PLAN

This claims the benefit of U.S. Provisional Patent Application 61/211,985, filed Apr. 6, 2009 and hereby incorporated by reference herein.

The invention relates generally to a method and apparatus for displaying search results while generating a media plan via a user interface.

BACKGROUND

Advertisers are continually facing more and more options for presenting advertisements to consumers. However, with this increase in available options, it becomes more difficult to generate a media plan that focuses on a particular targeted audience.

SUMMARY OF THE INVENTION

The present invention addressed this problem by organizing information about available media formats for advertising options (called "units" or "assets" herein) in a database in a number of ways. First, information about the targeted audience, e.g., demographic data, for the advertising options is linked to behavior information. In addition, the behavior data is also linked to the available media formats. The user is presented with an interface in which a campaign may be generated (a "campaign" according to the present invention is an incomplete advertising plan) resulting in a media plan (a "media plan" according to the present invention is a final, completed advertising plan) which targets a desired audience. In particular, according to the present invention, the user provides certain details about the targeted audience for the current campaign through the user-interface (e.g., desired demographic data) and then generates a search of the database, stored at a central location. Possible advertising options are then presented to the user in a search results window based upon "behaviors" (a "behavior" according to the present invention is a class or type of activity organized based on how or where the advertising is presented to the targeted audience) which are associated with that demographic. Each behavior is organized hierarchically based on a top-level description and descriptions of sub-components of that behavior. The search window is selectively presented in one of two views, a BEHAVIOR & MEDIA view or a LIFELINE view, and provides certain statistical information about the advertising options that can be evaluated by the user in generating the advertising campaign. The user navigates the search window to choose desired media format options for the campaign, and, once complete, saves the current campaign as a completed media plan. Optionally, the user may choose one ore more particular assets for the desired format in generating the media plan.

In particular, the present invention provides a method for displaying search results while generating a campaign from information about available units stored in a central computer database, the information comprising a set of formats for the available units and associated ancillary information. The method requires entering selective criteria at a remote computer coupled to the central computer database. Next, the central computer database is searched based upon the entered selective criteria and identifying corresponding formats. Finally, the results from the search are displayed at the remote computer, the results constituting the identified corresponding formats and displayed according to the associated ancillary information.

The present invention also provides an apparatus for generating a campaign from information about available units. The apparatus includes a central computer database for storing information about available units comprising a set of formats for the available units and associated ancillary information. The apparatus also includes a web server computer system coupled to the central computer database for searching the central computer database based upon selective criteria and for identifying corresponding formats. Finally, the apparatus includes a remote computer coupled to the web server computer system and adapted to allow entry of the selective criteria and to provide the selective criteria to the web server computer system via the network and for displaying the results from the search, the results constituting the identified corresponding formats and displayed according to the associated ancillary information.

In further embodiments, the associated ancillary information comprises a time period for which the corresponding format is available. In addition, the results may be displayed on a timeline according to the associated time period. The timeline may identify results on preset time periods, such as a daily basis or a weekly basis. Further, the information may additionally comprise a set of first characteristic data and associated behavior information and associated behavior information for the set of formats for the available units and entering selective criteria may require selection of criteria from the set of first characteristic information and the identified corresponding formats may be identified based on the associated behavior information for the first characteristic data matching the search criteria. Finally, the results displayed may further comprise associated statistical information for the formats, the campaign is an advertising media campaign, the available units may comprise available advertising units, the first characteristic data may comprise demographic information, the behavior information may comprise identified behaviors performed by an advertising audience and the set of formats for the available advertising units may comprise the types of advertising available.

In both the claimed method and apparatus, the assets may be displayed according to behaviors at the client computer and the search results may be displayed in hierarchical form.

BRIEF DESCRIPTION OF DRAWINGS

The above and related objects, features and advantages of the present invention will be more fully understood by reference to the following detailed description of the presently preferred, albeit illustrative, embodiments of the present invention when taken in conjunction with the accompanying drawing wherein:

FIG. 5 is a partial screen shot showing the search block component of the graphical user interface of an embodiment of the present invention.

FIG. 6 is a partial screen shot showing the results/planner block component of the graphical user interface of an embodiment of the present invention.

FIG. 13 is a partial screen shot showing the top-level portions of a type of behavior appearing in the results/planner block component of the graphical user interface in the BEHAVIOR & MEDIA view mode.

FIGS. 14A to 14C are partial screen shots showing different views of a single behavior appearing in the results/planner block component of the graphical user interface in the BEHAVIOR & MEDIA view mode.

FIG. 15 is a partial screen shot showing the media summary stats for all levels of a single behavior appearing in the results/planner block component of the graphical user interface in the BEHAVIOR & MEDIA view mode.

FIG. 16 is a partial screen shot showing the media summary stats for a category sub-component of a single behavior appearing in the results/planner block component of the graphical user interface in the BEHAVIOR & MEDIA view mode.

FIG. 17 is a partial screen shot showing the media summary stats for a type sub-component of a single behavior appearing in the results/planner block component of the graphical user interface in the BEHAVIOR & MEDIA view mode.

DETAILED DESCRIPTION

Figure 1:
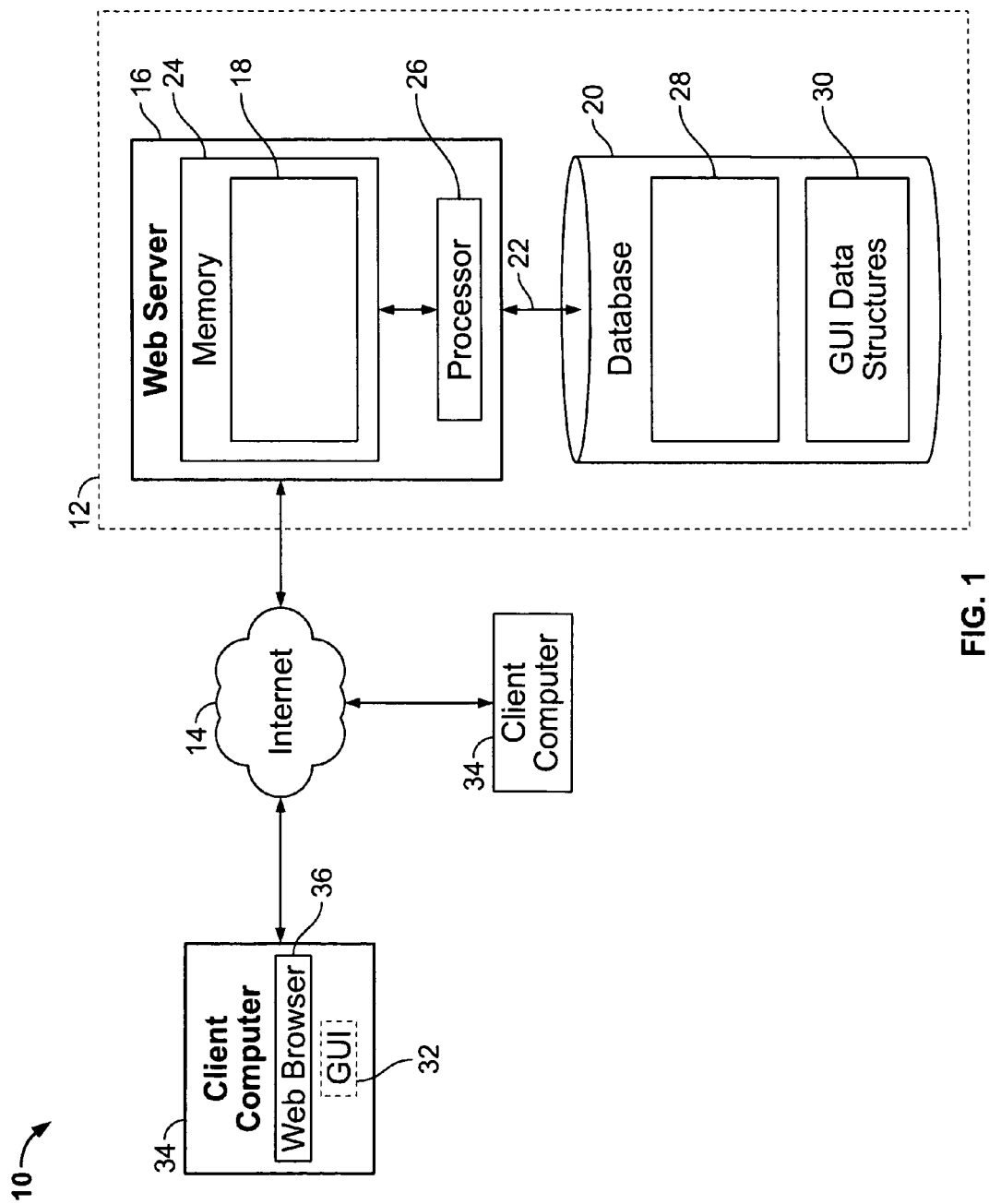
FIG. 1 is a block diagram of a networked system environment in which a Web-based search engine for generating a media plan is employed.

Referring to FIG. 1, a networked system environment 10 includes a system 12 connected to a network 14. In one embodiment, as illustrated, the network 14 is the Internet and the system 12 is implemented as a Web-based architecture, however, the present invention is not limited to operations over the Internet, and other types of networks may be used in conjunction with the present invention. The system 12 includes a Web server 16, which is configured with a Web-based application 18, and a database 20 that is coupled to the Web server 16 by a data link or bus 22. The Web-based application 18, which is stored in an internal memory 24 and executed by a processor 26, allows access to the database 20. The database 20 includes data structures that store data 28, and is the main source and storage for that data. The database 20 further includes graphical user interface (GUI) data structures 30 that store information for use in producing GUI 32.

Also coupled to the network 14 are one or more client computers 34 which are operated by users of the application 18. The application 18 provides the GUI 32 to the user of the client computer 34, via a client device, for example, a Web-browser 36, as shown. The GUI 32 is an intuitive interface that is described below. The system 12 thus allows a user to access in a fast and reliable manner data from the database 20 and to display that data in an appropriate form. The GUI data structures 30 and data 28 can be modified or updated as well by a user with appropriate privileges, e.g., an administrator.

Figure 2:
FIG. 2 is a screen shot of the graphical user interface of an embodiment of the present invention which illustrates the four main components thereof.
Figure 2:
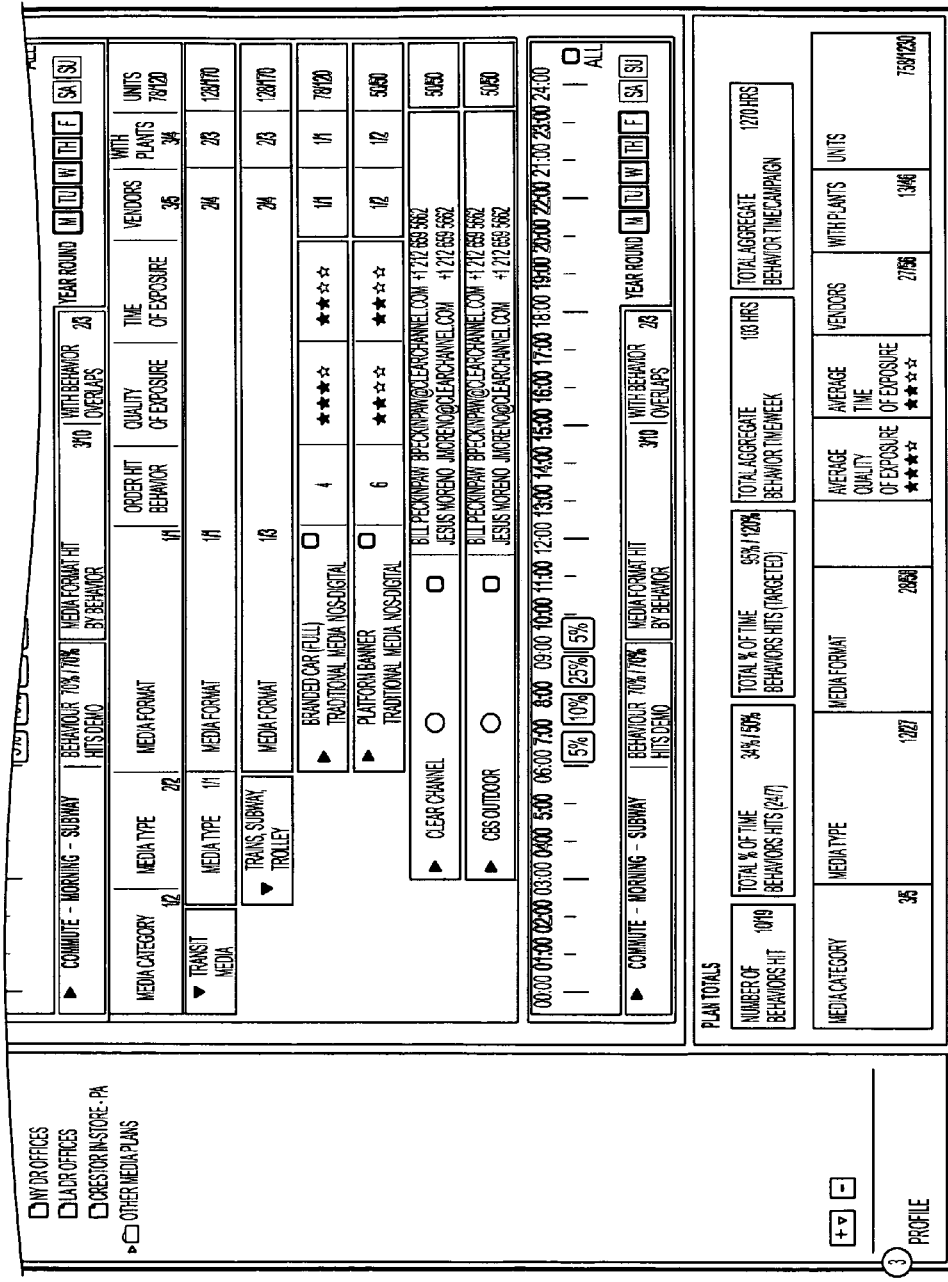

FIG. 2 is a screen shot of an exemplary GUI 32 of the present invention comprising four distinct components, including logo block 40, campaign block 42, search block 44 and results/planner block 46. Each of these components, and the functionality provided thereby, is described in more detail below.

In the preferred embodiment of the present invention, data 28 in database 20 constitutes information about advertising units/assets and corresponding information about the associated unit/asset. As explained below, the user, via GUI 32, conducts a search of the database 20 based on certain selected criteria, and the results of the search are presented to the user via a window in GUI 32. The user then evaluates the search results and selects some or all of the search results to constitute a media plan.

Figure 8:
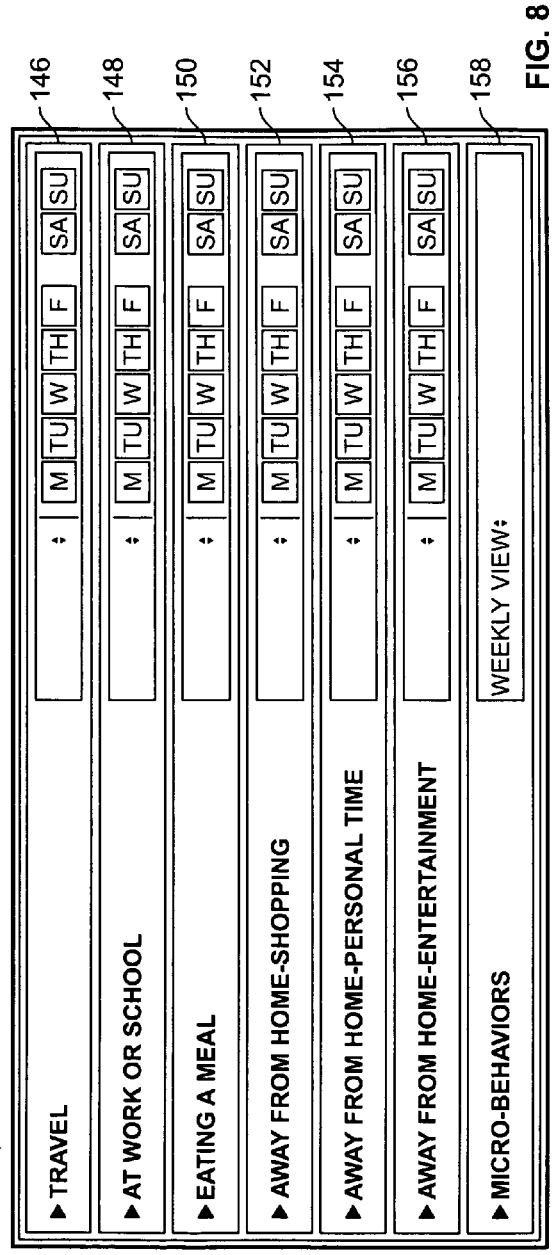
FIG. 8 is a partial screen shot showing the results window portion of the results/planner block component of the graphical user interface in the BEHAVIOR & MEDIA view mode.

In particular, according to the presently preferred embodiment of the invention, data 28 contains two sets of information. The first set of information comprises, for example, demographic information of the type used by advertisers to identify different groups of people for targeted advertising campaigns. Demographic information is used herein as any characteristic used to identify a target audience for an advertising campaign, see, e.g., the search fields provided in search block 44 shown in FIG. 5 and discussed below. The first set of information also includes behavior information linked to this demographic information. Some types of behaviors are shown in FIG. 8 and discussed below, including: 1. Travel; 2. At Work Or School; 3. Eating A Meal; 4. Away From Home—Shopping; 5. Away From Home—Personal Time; 6. Away From Home—Entertainment; and 7. Micro-Behaviors. The links between the demographic information and the behaviors are generated based on, e.g., survey data. For example, the demographic information could include: 1. 30-40 year old males; 2. residing in New York City; and 3. having a salary of $50-70 thousand per year. One type of behavior could be commuting to work. Statistical information about each behavior, e.g., what percentage of the demographic is performing the particular behavior at particular time periods, is also stored. The second set of data comprises the available media formats that can be used to generate a media campaign and a link to the associated behaviors for each available media format.

Figure 3:
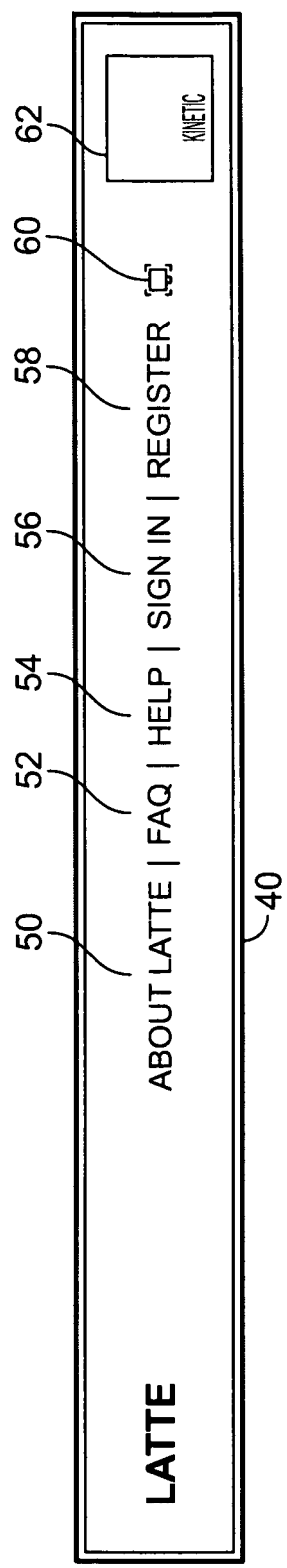
FIG. 3 is a partial screen shot showing the logo block component of the graphical user interface of an embodiment of the present invention.

FIG. 3 is a screen shot of a portion of exemplary GUI 32 which shows the logo block 40 in greater detail. Logo block 40 preferably includes a label 48 used to identify GUI 32, an about link 50 used to access an URL that provides overview information about the system, a FAQ link 52 used to access an URL that provides more detail information about the system in the conventional frequently-asked-questions format, a help link 54 used to access an URL that provides the user with access to a help database in a conventional manner, a sign-in link 56 that provides access to a window used by previously registered users to login to the system, a register link 58 that provides access to a window used to register for use of the system, a full-screen link 60 used to expand GUI 32 to use the entire display screen of the client computer 34 and a logo area 62 used for identification purposes.

Figure 4:
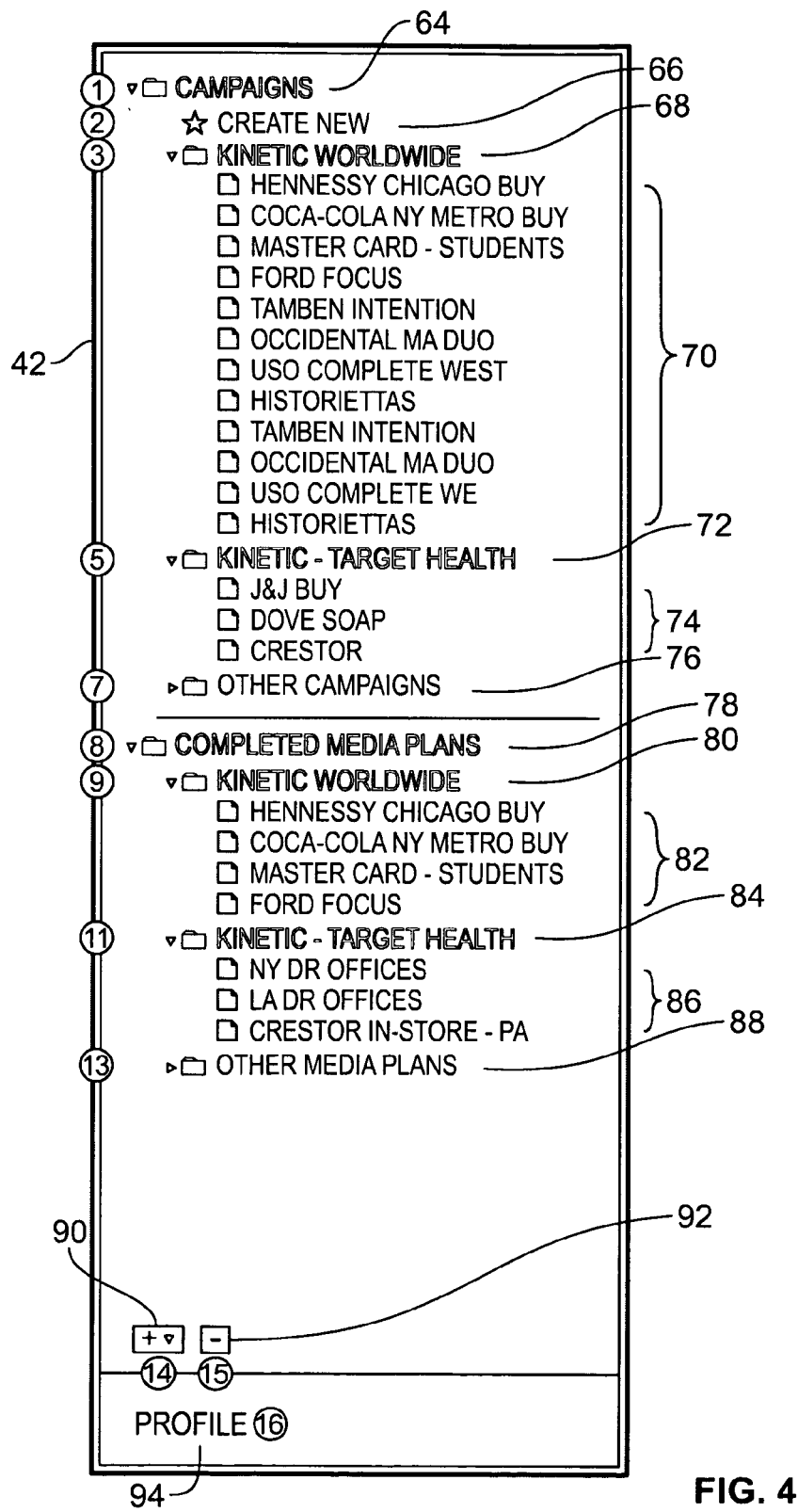
FIG. 4 is a partial screen shot showing the campaign block component of the graphical user interface of an embodiment of the present invention.

FIG. 4 is a screen shot of a portion of exemplary GUI 32 which shows the campaign block 42 in greater detail. As discussed above, a campaign is an incomplete advertising plan, here, for example, a set of search results with or without user-based selections that can be reopened by the user for further modification/election of the search results and a media plan is a finalized campaign including user-based selections of the search results that is read-only and cannot be further modified. Campaign block 42 includes a campaign section 64 and a completed media plan section 78, along with a link 90 used to access an additional window for adding new campaigns and folders, a link 92 used to delete a selected campaign and a profile link 45 used to access a profile screen which is used to modify the profile of the currently logged user. Campaign section 64 includes a link 66 for creating a new campaign that invokes the search component of the embodiment and folders 68, 72, 76 for organizing and displaying saved campaigns 70, 74. Completed media plan section 78 includes folders 80, 84, 88 for organizing and displaying saved media plans 82, 86. As evident from FIG. 4, each of the folders 68, 72, 76, 80, 84, 88 may be toggled between a state in which the contents of the respective folders is displayed and a state in which the contents are hidden. The folders are user-defined and may be added via the add-campaign link 90.

Figure 5:
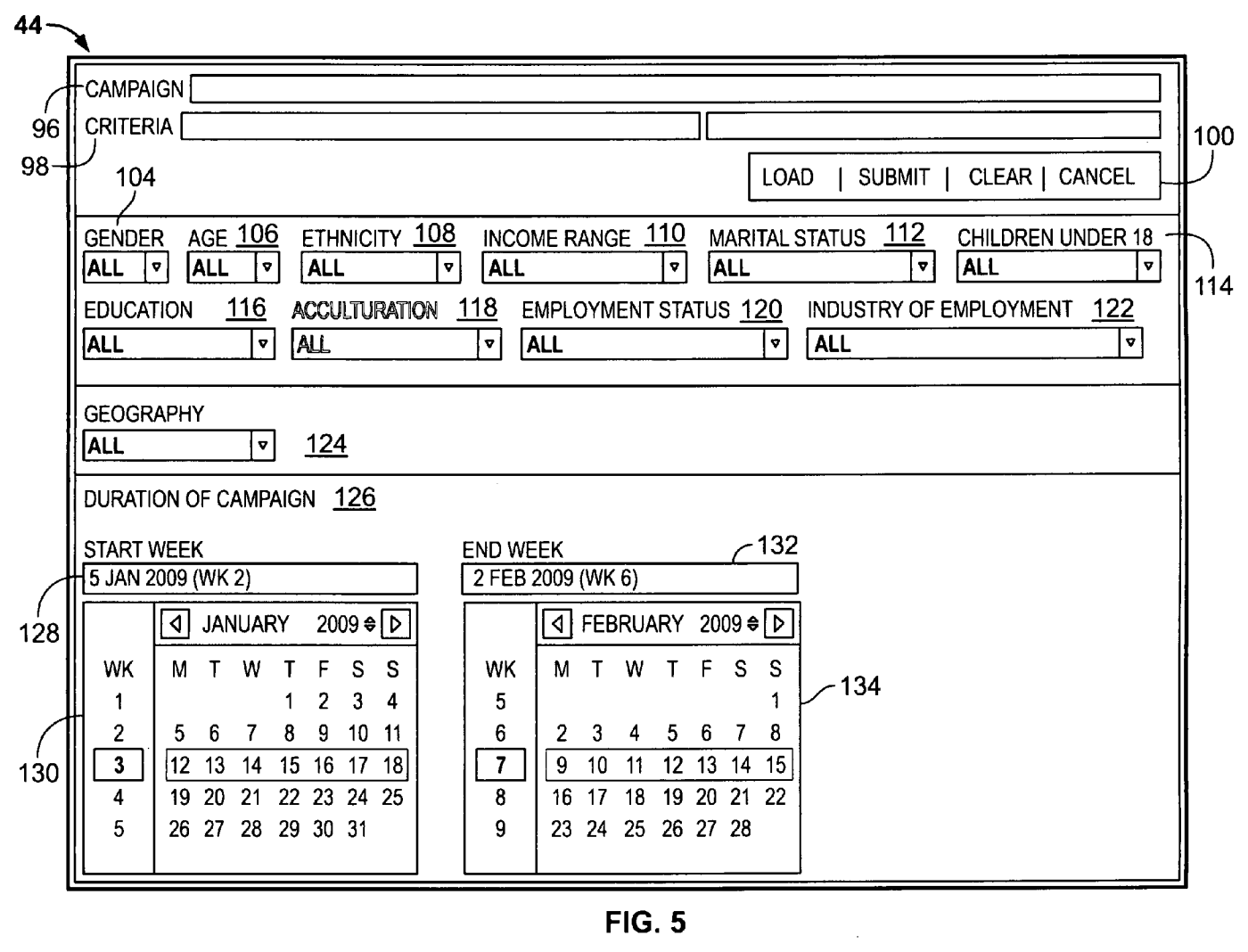

FIG. 5 is a screen shot of a portion of exemplary GUI 32 which shows the search block 44 in greater detail. Search block 44 includes a field 96 for entry of a unique name for the current search, which field is automatically filled in if a previously saved search is being used, and a set of buttons 100 used to control the current search. Buttons 100 include a LOAD button for accessing a screen to load a stored campaign, a SUBMIT button used to forward the current search terms to the server 16 for running a query on the database 20, a CLEAR button used to return all search entries to the default state and a CANCEL button used to close the search block without executing the current search. Search block 44 also includes a criteria field 98 that holds the terms used in the present search. Field 98 is automatically filled in when using a previously saved search. Performance of a search requires at least one valid criterion, other than geography, and a particular geography (i.e., geographic location) to be entered in field 98. In addition, search field also includes a number of pull-down menus which are used to select criteria that is then automatically entered into field 98. These menus include the gender pull-down menu 104, the age pull-down menu 106, ethnicity pull-down menu 108, income range pull-down menu 110, marital status pull-down menu 114, education pull-down menu 116, acculturation status pull-down menu 118, employment pull-down menu 120 and industry of employment pull-down menu 122 and geography pull-down menu 124. There are two fields 128 and 132 used to enter, respectively, the start and end dates for the current campaign. Each field 128, 132 has associated date picker boxes 130, 134 which are used to automatically populate the associated date fields 128, 132 in the correct format.

FIG. 6 is a screen shot of a portion of exemplary GUI 32 which shows the results/planner block 46 in greater detail. The results/planner block 46 has a number of distinct portions, including view toggle buttons section 136 which allow the user to switch between the BEHAVIOR & MEDIA view and the LIFELINE view (these views are discussed in more detail below); selection toggle buttons section 138 which allow the user to choose how to display the search results; filter control section 140 which allow the user to filter the search results based on certain criteria, discussed below with respect to FIG. 10; window 142 which displays the actual search results in a form which depends on the user settings for the view toggle buttons 136, selection toggle buttons 138 and filters within the filter section 140 (if enabled) (window 142 is used for planning/election of the current campaign); and plan totals section 144 which is a read-only section used to provide summary information for the current search and of elections made for the current search, as discussed below.

Window 142 in FIG. 6 presents the results of the search to the user in a manner controlled by the settings of view toggle buttons section 136, selection toggle buttons 138 and the filters of filter control section 140. In FIG. 6, the view toggle buttons section 136 is set to BEHAVIOR & MEDIA VIEW, the selection toggle buttons are set to SHOW ALL; and there are no filters set in filter section 140. In addition, as discussed below, the user has opened certain categories and made certain selections in window 142 for the current campaign. A portion 226 of window 142 is discussed below with respect to FIG. 12.

Figure 7:
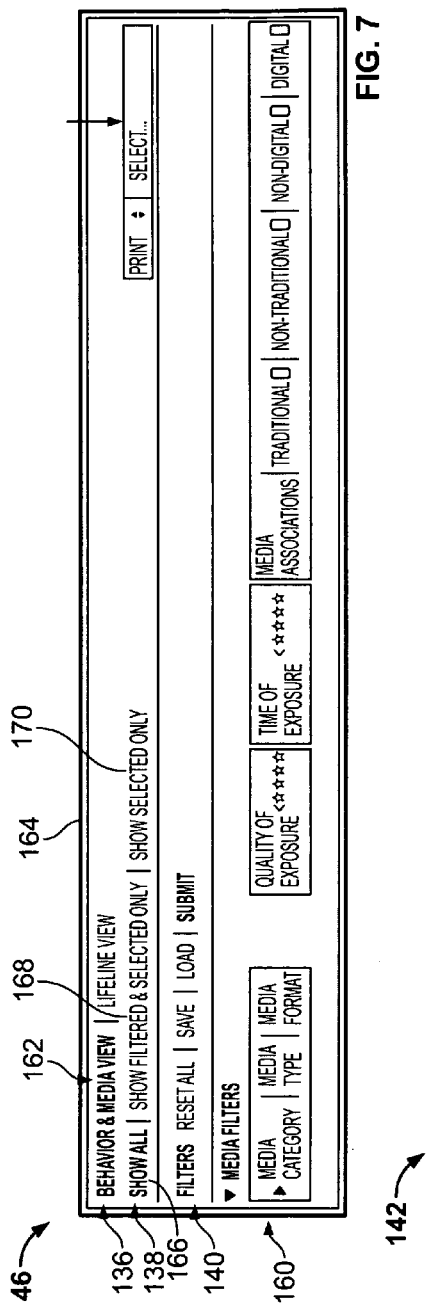
FIG. 7 is a partial screen shot showing the header portion of the results/planner block component of the graphical user interface in the BEHAVIOR & MEDIA view mode.

FIG. 7 shows the header portion of results/planner block 46 in greater detail, including the view toggle buttons section 136, selection toggle buttons section 138 and the media filter controls 160 of filter control section 140. There are two view toggle buttons, BEHAVIOR & MEDIA view button 162 and LIFELINE view button 164, discussed below with respect to FIGS. 8, 9A and 9B. There are three selection toggle buttons, SHOW ALL button 166, SHOW FILTERED & SELECTED button 168 and SHOW SELECTED ONLY button 170. A user clicks on the particular view button to activate it, and the non-elected view toggle button (or buttons) will be shown in a lighter shade, e.g., grey, while the elected view toggle button will be shown in a darker, more highlighted fashion. Only one of the toggle buttons (view 136 or selection 138) may be active at any one time. The filter buttons 160 of filter control section 140 are discussed in detail below with respect to FIG. 10.

The selection toggle buttons 166, 168, 170 are used to select different ways to show the results of the search. SHOW ALL button 166 will cause all results of the search to be shown. SHOW FILTERED & SELECTED button 168 will cause all results that correspond to the pre-set filters (if any) and which also have been selected by the user for the current campaign. Finally, SHOW SELECTED ONLY button 170 will cause only those results that have been selected to be shown. As one of ordinary skill in the art will readily recognize, other views can be provided based on the particular implementation, e.g., a button which would show only the filtered results.

FIG. 8 is a view of window 142 in the BEHAVIOR & MEDIA view, with the SHOW ALL button set and no filters applied. Each media category 146 to 158 is closed, as would occur immediately after a search has been initiated. In particular, seven different types of media behaviors are available in the search results shown in FIG. 8, including travel behavior 146, at work or home behavior 148, eating a meal behavior 150, away from home—shopping behavior 152, away from home—personal time behavior 154, away from home—entertainment behavior 156 and micro-behaviors 158. A behavior is broadly defined as a particular action or activity in which a person would be undertaking in which that person would be exposed to certain types of media, for, e.g., advertising purposes. In FIG. 6, three types of search result behaviors are shown, including away from home—shopping behavior 152, away from home—personal time behavior 154 and travel behavior 146.

Figure 9A:
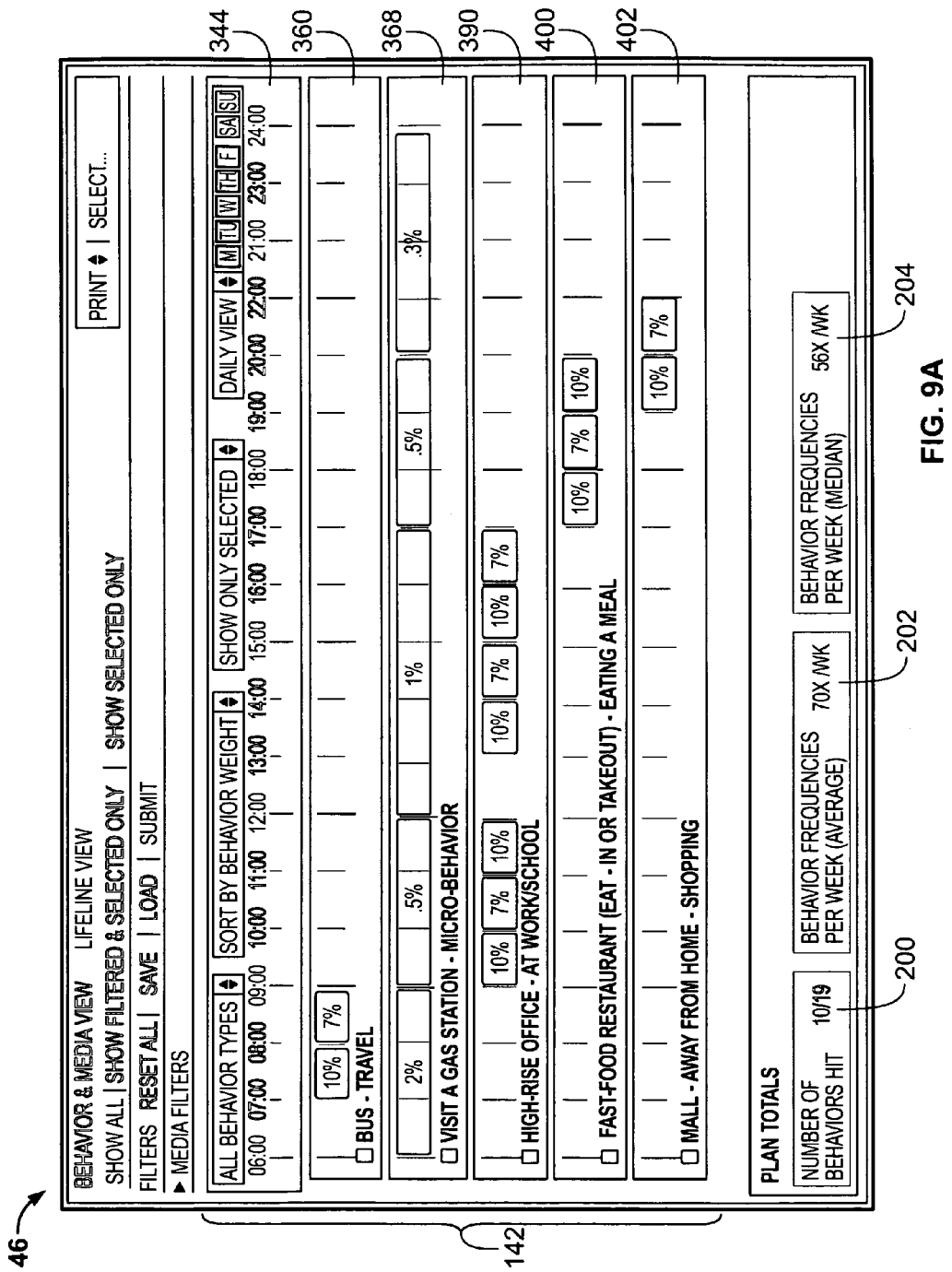
FIGS. 9A and 9B are respective partial screen shots showing the results window portion of the results/planner block component of the graphical user interface in the LIFELINE view mode, in the DAILY VIEW view mode and WEEKLY VIEW view mode, respectively.
Figure 9B:
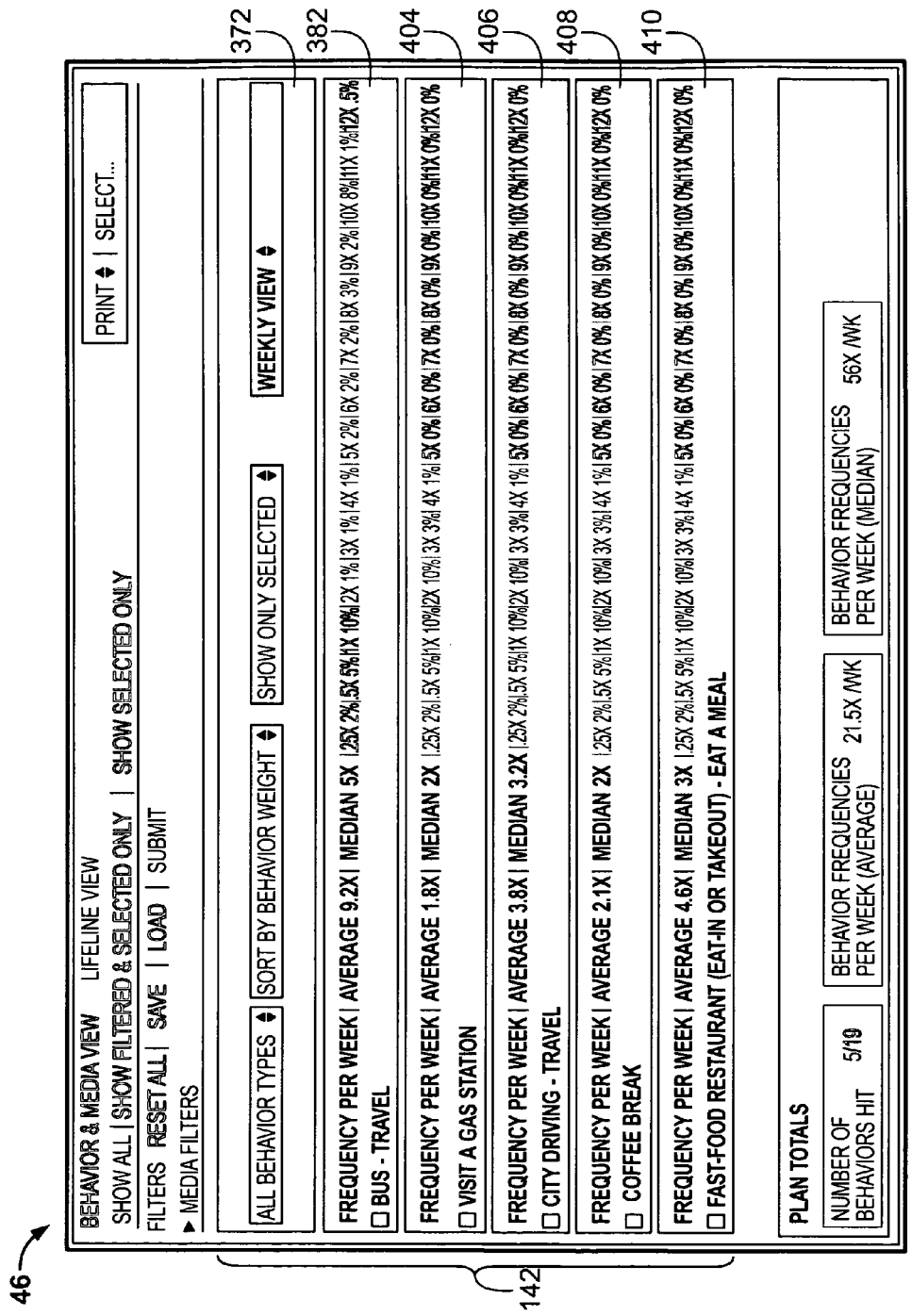

FIGS. 9A and 9B show window 142 in the LIFELINE view, used to present the search results and selections for the current campaign in a time based manner. In particular, the LIFELINE view shows a graphical chart of all behaviors for a demographic group over a period of time. In FIG. 9A, LIFELINE view window 142, shown in the DAILY VIEW mode, includes a top level component 344 and a series of behavior sub-components 360, 368, 390, 400 and 402. As discussed below with respect to FIG. 21, the top-level component 344 provides certain sorting controls and header information for the various behavior sub-components which may be present in LIFELINE view window 142, e.g., behavior sub-components 360, 368, 390, 400 and 402 for the example campaign shown in FIG. 9A. Behavior sub-components 360, 368, 390, 400 and 402 are described below with respect to FIGS. 22 and 23. In FIG. 9B, LIFELINE view window 142 is shown in the WEEKLY VIEW mode and in the displayed embodiment includes a top-level component 372 and behavior sub-components 382, 404, 406, 408 and 410. The top-level component 372 provides sorting controls for the behavior sub-components, e.g., the behavior sub-components 382, 404, 406, 408 and 410 of FIG. 9B, which are described with respect to FIG. 24 below. The behavior sub-components for the LIFELINE weekly view are described below with respect to FIG. 25.

Figure 10:
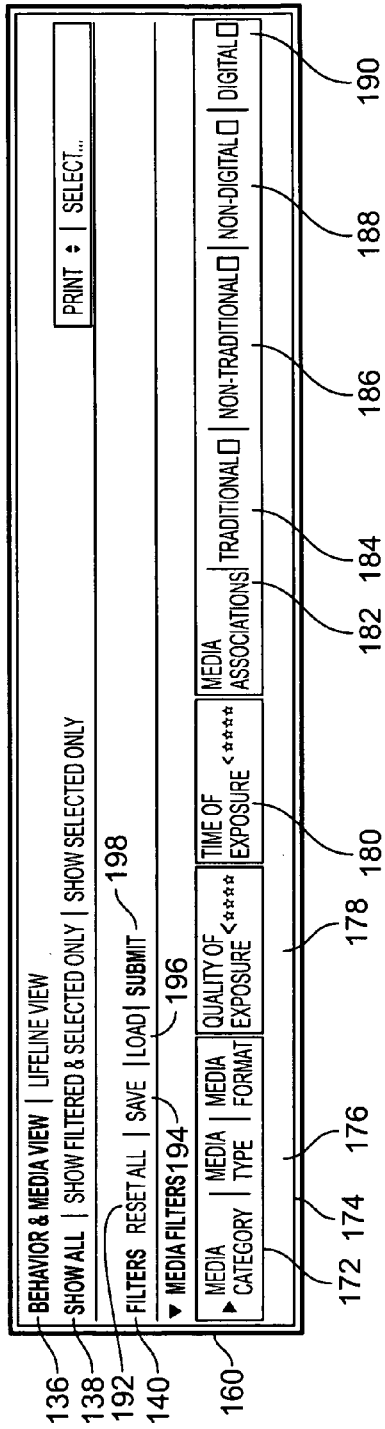
FIG. 10 is a partial screen shot showing the header portion of the results/planner block component of the graphical user interface with the media filters section expanded.

FIG. 10 shows the header portion of results/planner block 46 in greater detail, including the view toggle buttons 136, selection toggle buttons 138 and the media filter controls 160 of filter control section 140 expanded. The media filters buttons allow the user to filter the results of the current search by certain criteria associated with each type of available advertising, for example. The filter control section 140 also includes, preferably, four control buttons, including RESET ALL button 192, SAVE button 194, LOAD button 196 and SUBMIT button 198. The RESET ALL button 192 resets the filters to the default, e.g., usually unselected, state. The SAVE button 194 saves the current setting of the filters. The LOAD button 196 allows a previously saved filter set to be loaded. The SUBMIT button 198 causes the currently selected filter set to operate on the current search results and modify the results shown in window 142.

Media filter controls 160 in FIG. 10 preferably include media category box 172, media type box 174, media format box 176, quality of exposure tolerance level set 178, time of exposure tolerance level set 180, and media association flags 182 which include traditional box 184, non-traditional box 186, non-digital box 188 and digital box 190. The three media select boxes, i.e., media category box 172, media type box 174 and media format box 176, open pull-down menus which allow various predetermined information to be selected associated with categories, types and formats, respectively. The two tolerance level settings, i.e., quality of exposure tolerance level set 178 and time of exposure tolerance level set 180, allow specific levels to be set by, e.g., selecting a number of stars. Finally, the user can select the desired media association flags 182, e.g., traditional. As one of ordinary skill in the art will readily recognize, the filter settings provided in the disclosed embodiment are merely illustrative of a much broader range of possible filter settings. Other types of filter settings could be based on time of day or behavior type, for example.

Figure 11:
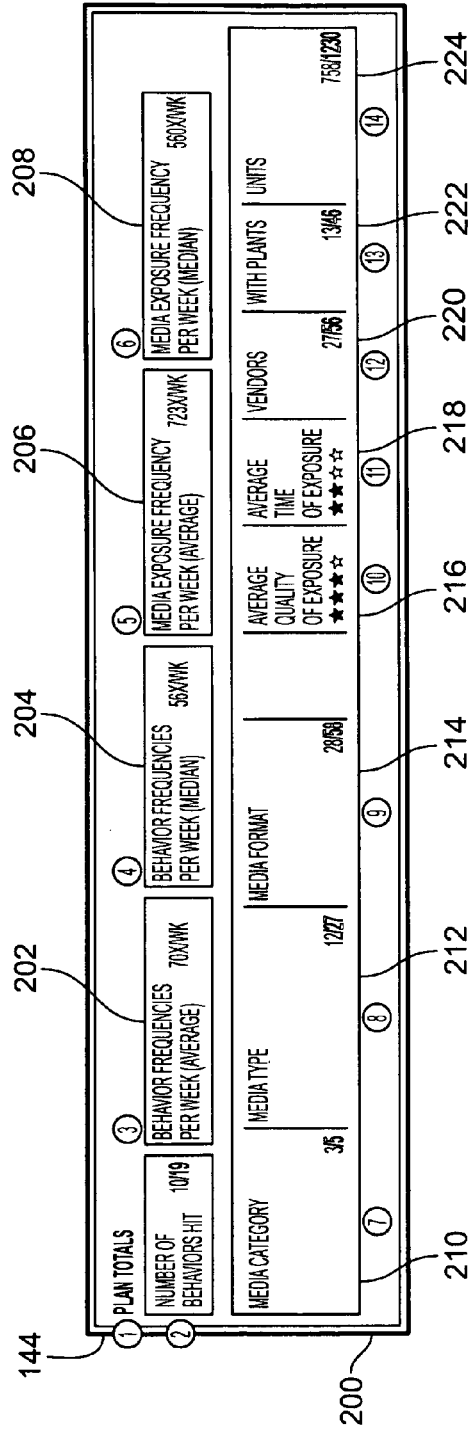
FIG. 11 is a partial screen shot showing the PLAN TOTALS portion of the results/planner block component of the graphical user interface of an embodiment of the present invention.

FIG. 11 is a partial screen shot of results/planner block 46 showing the plan totals portion 144 in greater detail for the BEHAVIOR & MEDIA view. Results/planner block 46 includes a number of sub-blocks used to provide various details about the current search and the campaign selected from that search. The user does not interact with plans total portion 144, instead the various information provided is updated automatically as the user makes or changes selections for the current campaign. In the presently preferred embodiment, results/planner block 46, in the BEHAVIOR & MEDIA view, includes the following separate sub-blocks: number of behaviors hit block 200; average behavior frequencies per week block 202; median behavior frequencies per week block 204; average media exposure frequencies per week block 206; median media exposure frequency per week block 208; media category block 210; media type block 212; media format block 214; average quality of exposure block 216; average time of exposure block 218; vendors block 220; w/plants block 222; and units block 224. In the LIFELINE view, the plan totals portion 144 displays only the number of behaviors hit block 200 average behavior frequencies per week block 202 and median behavior frequencies per week block 204 (see FIG. 9A).

The number of behaviors hit block 200 provides the count for the number of selected behaviors and the total available behaviors in the current campaign and search. The average behavior frequencies per week block 202 provides the sum of the selected average weekly behavior frequencies. The median behavior frequencies per week block 204 provides the sum of the median weekly frequency behaviors. The average media exposure frequencies per week block 206 is calculated as the sum of, for each selected behavior, the product of the average frequency per week and the number of returned media types. The median media exposure frequency per week block 208 is calculated as the sum of, for each selected behavior, the product of the median frequency per week and the number of returned media types. The media category block 210 provides the count for the number of selected media categories and the total available media categories in the current search and campaign. The media type block 212 provides the count for the number of selected media types and the total available media types in the current search and campaign. The media format block 214 provides the count for the number of selected media formats and the total available media formats in the current search and campaign. The average quality of exposure block 216 provides an indication of the average of the quality of exposure ratings for all of the current user-selections. The average time of exposure block 218 provides an indication of the average of the time of exposure ratings for all of the current user-selections. The vendors block 220 provides the count for the selected and total number of vendors in the current campaign and search. The w/plants block 222 provides the number of selected vendors having disclosed assets to the system, and the total number of vendors having disclosed assets to the system in this set of search results. The units block 224 provides the count for the selected and total number of units in the current campaign and search.

The foregoing description provides an overview of the various parts of the present invention. In operation, a user at a client computer 34 accesses the system 12 by way of GUI 32 provided in web browser 36 through a network 14 such as the Internet. The user first logs on to the system in a conventional manner by selecting sign-in link 56 in GUI 32. Once the user is authorized, a new campaign can be instituted or a saved campaign can be recalled from memory, using the appropriate link in campaign block 42, as discussed above with respect to FIG. 4. Next, the user may select (if a new campaign) or modify (if a recalled campaign) the search fields in search block 44, as discussed above with respect to FIG. 5. Once the search criteria is set in the search fields of search block 44, the user may then elect to run the search by selecting the SUBMIT button in search block 44. This causes the search criteria to be forwarded to the application 18 of system 12, which runs the search of database 20 and provides the results thereof to the user via GUI 32, displayed in window 142 according to the user settings discussed above with respect to FIG. 7.

Once the search results have been returned to the user, the user can complete the media plan by reviewing the available options within window 142 at the client end, making selections of a subset of the available media formats for the identified behaviors, and then saving the results as a finalized media plan. In the presently preferred embodiment of this present invention, the media formats constitute the particular types of advertising available, and the media plan constitutes the set of types of advertising elected for a current advertising campaign. However, the invention has broad application beyond advertising and should not be limited thereto by the description of the presently preferred embodiment provided herein.

Figure 12:
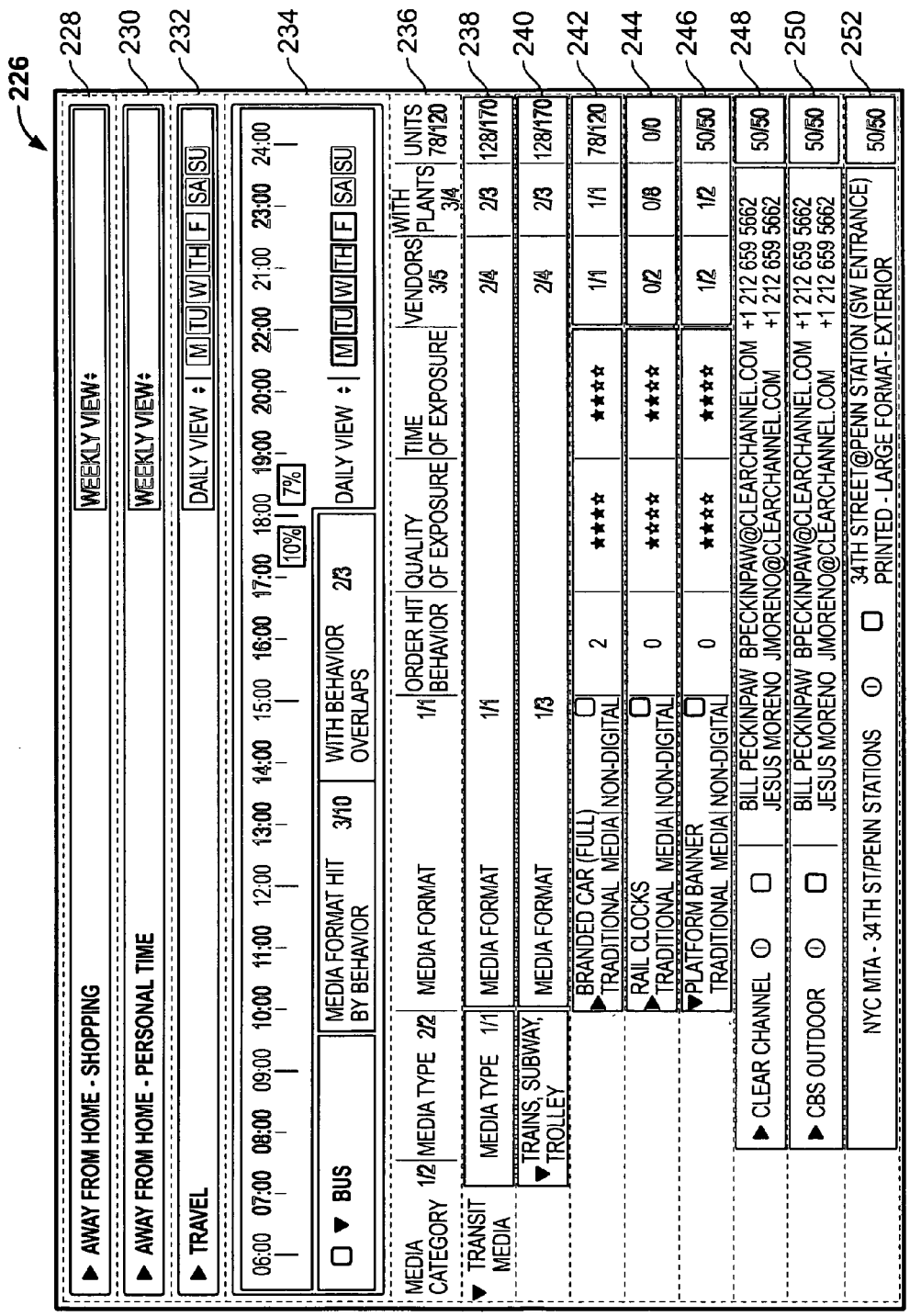
FIG. 12 is a partial screen shot showing an enlarged sub-portion of the results/planner block component of the graphical user interface in the BEHAVIOR & MEDIA view mode.

FIG. 12 is a partial screen shot of the results/planner block 46 showing an enlarged sub-portion 226 of window 142 which is useful in understanding how the user selects the various units for the current campaign, which, when finalized, becomes the media plan. As shown in FIG. 12, the search results are organized in hierarchical form with the top level corresponding to behavior type, shown as behavior types 228, 230 and 232. Each behavior type 228, 230 and 232 can be toggled between opened and closed states, as discussed with respect to FIG. 13 below. In FIG. 12, behavior types 228 and 230 are closed and the lower levels of each behavior type are hidden, while behavior type 232, TRAVEL, is open and the lower levels are shown. In particular, the next lower hierarchical level are the actual behaviors, shown in FIG. 12 as behavior 234 (BUS). There are three types of behaviors displayed, normal behaviors, away from home behaviors, and micro-behaviors, and these are displayed differently depending on the view selected, as discussed in more detail below with respect to FIGS. 14A to 14C. For each behavior, e.g., behavior 234 in FIG. 12, there will be a group of nested information describing the available media formats. For the behavior 234 in FIG. 12, the next sub-level will be media summary stats—all levels 236 (discussed with respect to FIG. 15), then media summary stats—category level 238 (discussed with respect to FIG. 16), then media summary status—type level 240 (discussed with respect to FIG. 17), and then media format(s) 242, 244, 246 (discussed with respect to FIG. 18), and finally, for each media format, vendor(s) 248, 250 (discussed with respect to FIG. 19) and an associated unit/asset 252 (discussed with respect to FIG. 20). As evident from FIG. 12 and as discussed below, each of the levels, except for the asset level (which corresponds to the actual advertisement, for example), can be toggled open or closed to enable the respective sub-levels for that level to be either viewed or hidden, respectively.

In FIG. 13, behavior type level 228 is shown in detail, including toggle 254 (used to open or close the sub-levels to allow such levels to be viewed or hidden, as discussed above), label 256 (e.g., TRAVEL), a button 258 used, when the level is open, so select one of a daily view or a weekly view, and selection buttons 260 used, in the daily view, to select one or more days of the week. Normal and away from home behaviors are set by default to the daily view, while the micro-behavior is set by default to weekly view.

Figure 14B:
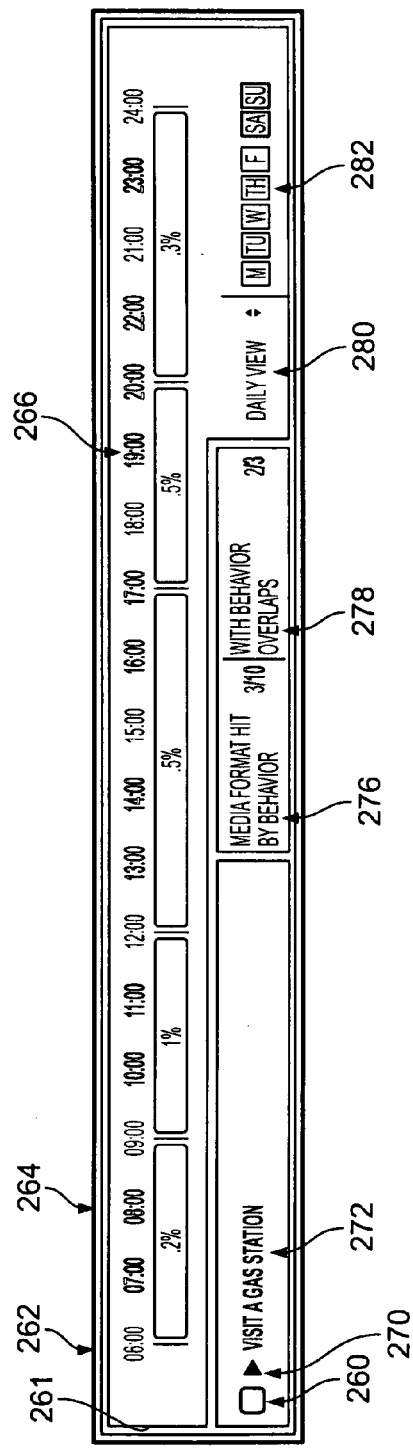
Figure 14C:
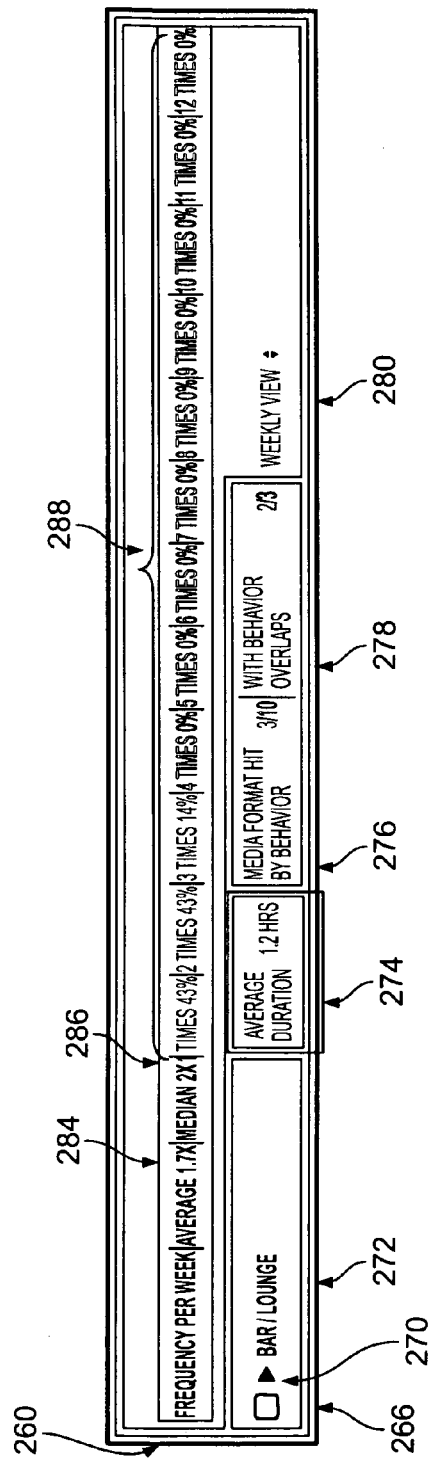

Each behavior level, e.g., behavior level 228 has a corresponding series of behaviors which are seen when the behavior level is toggled open, see, e.g., behavior level 234 in FIG. 12. FIG. 14A shows an example behavior level 260 (in daily mode) which includes major hashmarks 262 preferably provided to form three hour blocks, minor hashmarks 264 preferably forming one hour blocks when combined with the major hashmarks 266, visual indicators 266 for the current behavior showing the percentage of the demographic attributed to a particular block. Visual indicators 266 are provided in one hour blocks in this view and may be selected by the user. Behavior level 260 also includes a selection checkbox 268 used to select the particular behavior, a behavior toggle 270 used to open the sublevels for this behavior, a label 272 ("BAR/LOUNGE") for the behavior, a read-only average duration section 274 which is only shown for certain types of behaviors, a read-only media format hit by behavior section 276 which shows the number of media types selected and the number available for this type of behavior, a section 278 that provides an indication of overlap of the selections with other behaviors, a time range view toggle 280 that is used to switch between the daily and weekly views, and a day of week/day picker section 282 that is read-only and provides an indication of the days available for the particular behavior. FIG. 14B is an alternative behavior 261 for a micro-behavior type behavior in which the time display is shown in a different manner. In particular, although the major hash marks 262 and minor hash marks 264 are presented in the same manner as in FIG. 14A, the timeblocks 266 are not limited to one-hour durations for micro-behaviors. FIG. 14C shows behavior 260 in the weekly view, which provides overview information about the behavior, including average frequency per week 284, median frequency per week 286 and percentage frequency per week 288.

FIG. 15 shows the media summary stats—all levels subcomponent 236 of FIG. 12 in more detail. In particular, subcomponent 236 includes a media category count field 290 which provides the number of the selected and total media categories for this behavior in the current campaign, a media type count field 292 which provides the number of selected and total media types for this behavior in the current campaign, a media format count field 294 which provides the number of selected and total media types for this behavior in the current campaign, an other hit behaviors column label 296, a quality of exposure column label 302, a time of exposure column label 296, a vendor count field 304 which provides the number of selected and total vendors, a w/plants count field 300 which is a count of the number of vendors having disclosed assets to the system and a units/assets count field 306 which provides the number of selected and total assets. The column labels 296, 302 and 298 are headers for the sublevels below, as seen in FIG. 12.

FIG. 16 shows the media summary stats—category sub-component 238 of FIG. 12 in more detail. This sub-component provides information about a particular category, e.g., TRANSIT MEDIA as shown in FIG. 16. Sub-component 238 includes a media category name field 308 (here "TRANSIT MEDIA") and a number of fields which are duplicative from sub-component 236 but which are limited to information about only this particular category, including media type count field 292, media format count field 294, vendor count field 304, w/plants field 300 and units/assets count field 306.

FIG. 17 shows the media summary stats—type sub-component 240 of FIG. 12 in more detail. This sub-component provides information about a particular type within a category, e.g., TRAINS, SUBWAY, TROLLEY as shown in FIG. 16. Sub-component 240 includes a media type name field 312 (here "TRAINS, SUBWAY, TROLLEY") and fields which are duplicative from sub-component 236 but which are limited to information about only this particular type and category, including media format count field 294, vendor count field 304, w/plants field 300 and units/assets count field 306.

Figure 18:
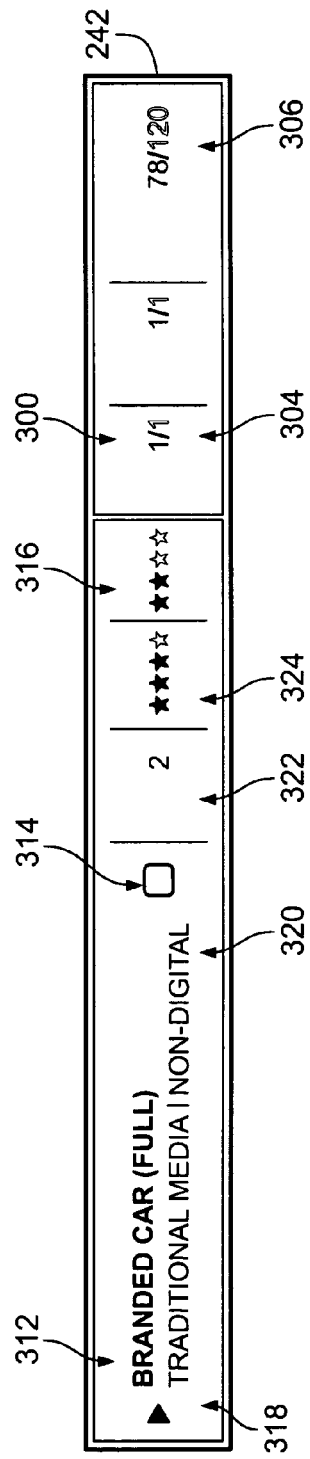
FIG. 18 is a partial screen shot showing a media format available for a single behavior appearing in the results/planner block component of the graphical user interface in the BEHAVIOR & MEDIA view mode.

FIG. 18 shows the media format sub-component 242 of FIG. 12 in more detail. This sub-component provides information about a particular media format, e.g., "BRANDED CAR (FULL)" as shown in FIG. 16. Sub-component 242 includes a media format toggle button 318 which is used to open or close the next lower sub-levels, a media format name field 312 (here "BRANDED CAR (FULL)"), media format flags field 320 which describe the type of format (e.g., traditional or alternative, digital or non-digital) and a select checkbox 314 used by the user to select this particular media format. Sub-component 242 also includes three fields used to provide overview information about this particular media format, including quality of exposure field 322, time of exposure field 324 and other behaviors hit count field 316. Finally, sub-component 242 also includes three fields which are duplicative from sub-component 236 but which are limited to information about only this particular format, type and category, including media format count field 294, vendor count field 304, w/plants field 300 and units/assets count field 306.

Figure 19:
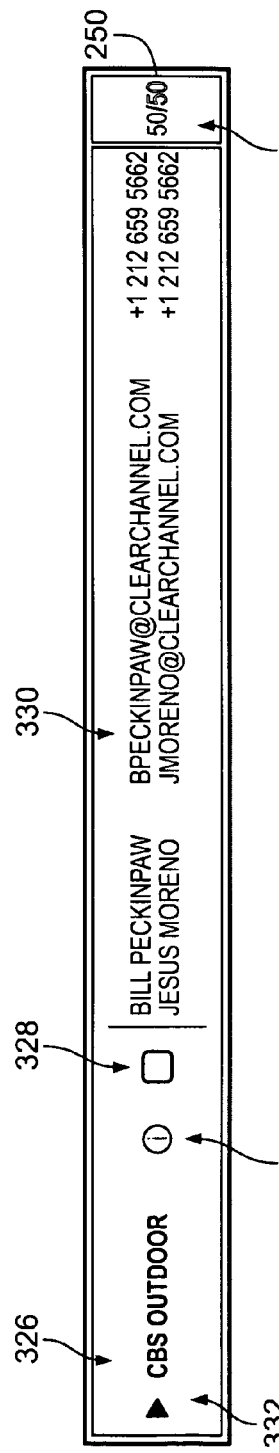
FIG. 19 is a partial screen shot showing a vendor for the associated media format for a single behavior appearing in the results/planner block component of the graphical user interface in the BEHAVIOR & MEDIA view mode.

FIG. 19 shows the vendor sub-component 250 of FIG. 12 in more detail. Sub-component 250 is used to provide information about the particular vendor of assets in this format, type and category. As shown in FIG. 19, sub-component 250 includes a vendor name field 326, a toggle button 332 used to open and close the next lower level, a vendor information button 334 used to access a pop-up window with more detailed vendor information, a select checkbox 324 used by the user to select this vendor as part of the current campaign, a vendor contact field 330 which includes detailed contact information for the vendor (e.g., as shown, name, email address and phone number), and also includes the vendor/assets count field 306 discussed above.

Figure 20:
FIG. 20 is a partial screen shot showing the details of a particular unit/asset for a particular vendor of a particular media format for a single behavior appearing in the results/planner block component of the graphical user interface in the BEHAVIOR & MEDIA view mode.

FIG. 20 shows the unit/asset sub-component 252 of FIG. 12 in more detail. As discussed above, in this presently preferred embodiment, an asset is the actual advertising to be purchased. Sub-component 252 includes an asset name field 336, here "NYC MTA—34$^{TH}$ ST/PENN STATION", an asset information button 342 used to access a pop-up window with more detailed asset information, a select checkbox 338 used by the user to add this particular asset to the current campaign and an asset information field which provides a short description of this particular asset (e.g., "34$^{TH}$ STREET @PENN STATION (SW ENTRANCE)—PRINTED—LARGE FORMAT—EXTERIOR").

Figure 21:
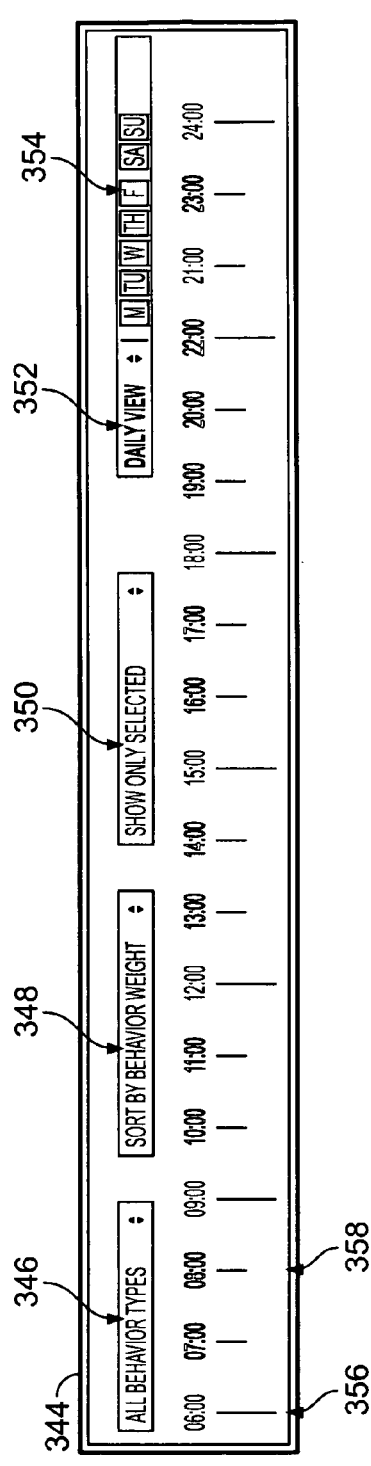
FIG. 21 is a partial screen shot showing the top-level time-line sub-component for all behaviors appearing in the results/planner block component of the graphical user interface in the LIFELINE DAILY VIEW mode.

The present invention provides the user with a visual display of the status of the selections for the current campaign, using the LIFELINE view shown in FIGS. 9A and 9B. In the daily LIFELINE view window 142, FIG. 9A, the top-level component 344, shown in detail in FIG. 21, provides sorting controls including a sort by behavior type select menu 346, a sort by options selection menu 348, a sort by selection menu 350, a time range view toggle 352 and a day picker 354. The sort by behavior type menu 346 allows the user to select all behavior types or from among the different types of behavior types available. The sort by options selection menu 348 allows sorting of the behaviors by weight, time of day or type. The sort by selection menu 350 allows a choice of three options: (1) show only the selected behaviors; (2) show selected and unselected behaviors; and (3) show only the unselected behaviors. The time range view toggle 352 allows the user to switch between the daily LIFELINE view (FIG. 9A) and the weekly LIFELINE view (FIG. 9B), while the day picker 354 allows the user to select one or more days of the week in the DAILY VIEW for display. Finally, the top-level component 344 includes major hash marks 356 representing three hour increments and minor hash marks 358 represent one hour increments (from 6:00 AM to midnight, 24:00) used as a header for the information displayed in the various behavior sub-components which will be directly below, e.g., behavior sub-components 360, 368, 390, 400 and 402 for the example campaign shown in FIG. 9A.

Figure 22:
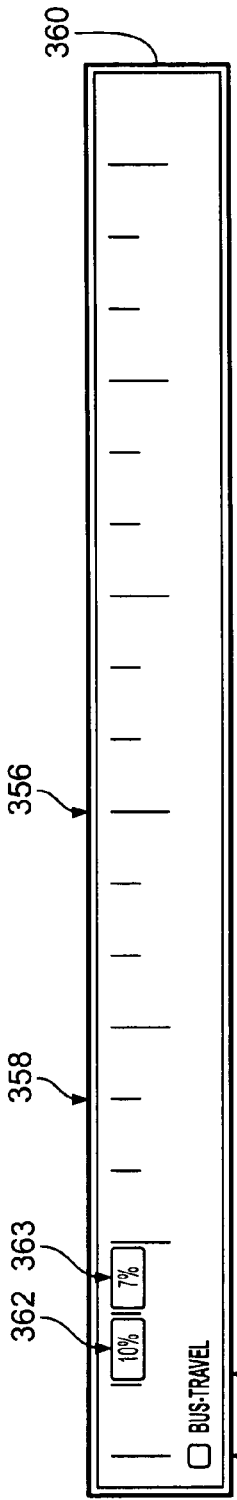
FIG. 22 is a partial screen shot showing a first type of single behavior time-line sub-component appearing in the results/planner block component of the graphical user interface in the LIFELINE DAILY VIEW mode.

FIG. 22 shows a detailed view of behavior sub-component 360 of FIG. 9A which is used for behaviors that are based on hourly selections, e.g., normal and away from home behaviors. Behavior sub-component 360 includes a label 366 which describes the type of behavior for this particular sub-component and major hashmarks 358 and minor hashmarks 360, which align with the corresponding hashmarks in top-level component 344 as can be seen in FIG. 9A. Behavior sub-component 360 also includes time blocks 362, 363 and a selection checkbox 364. The time blocks 362, 363 constitute one-hour blocks and are positioned at the point in time when the behavior is available, and include a visual indication of the percentage of the selected demographic that is engaged in the behavior for the particular block. The user can select one or more of the blocks displayed for the current campaign (preferably, the shaded color of the block changes from a first color when the block is not selected to a second color when the block is selected). Alternatively, the user can select selection checkbox 364 to select all of the blocks for the current campaign.

Figure 23:
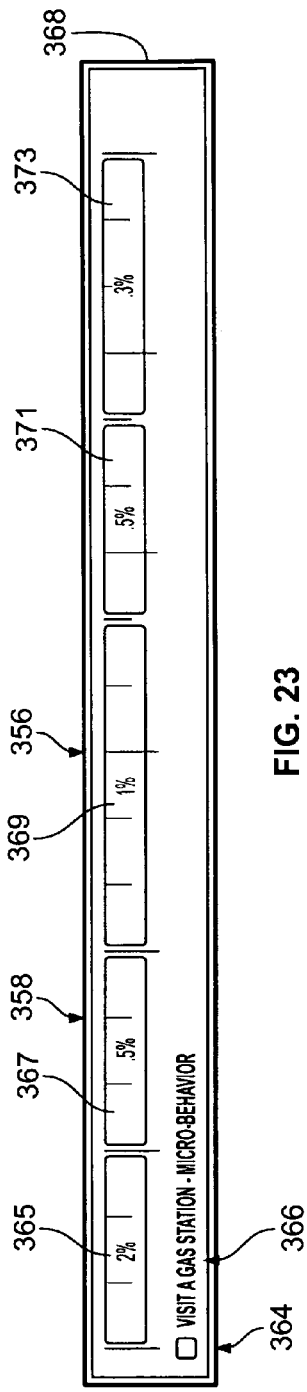
FIG. 23 is a partial screen shot showing a second type of single behavior time-line sub-component appearing in the results/planner block component of the graphical user interface in the LIFELINE DAILY VIEW mode.
Figure 24:
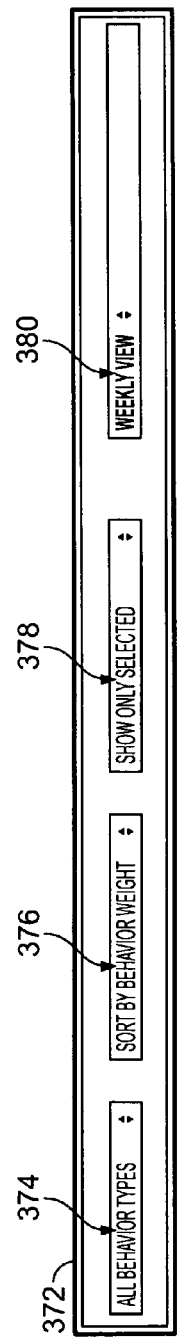
FIG. 24 is a partial screen shot showing the top-level time-line sub-component for all behaviors appearing in the results/planner block component of the graphical user interface in the LIFELINE WEEKLY VIEW mode.

FIG. 23 shows a detailed view of behavior sub-component 368 of FIG. 9A which is used for behaviors that are not based on hourly selections, e.g., micro-behaviors. Like behavior sub-component 360, behavior sub-component 368 also includes a selection checkbox 364, a label 366, major hashmarks 358 and minor hashmarks 360. Behavior sub-component 360 also includes time blocks 365, 367, 369, 371 and 373. Here, however, the length of the various time blocks is variable and not limited to one hour blocks. Thus, as shown in FIG. 23, time blocks 365, 367 and 371 last for three hours, time block 373 lasts for four hours and time block 369 lasts for five hours. As above, the user can select one or more of the blocks displayed for the current campaign (preferably, the shaded color of the block changes from a first color when the block is not selected to a second color when the block is selected) or can use selection checkbox 364 to select all of the blocks in the behavior sub-component.

The weekly LIFELINE view window 142, FIG. 9B, includes top-level component 372 and behavior sub-components 382, 404, 406, 408 and 410. Top-level component 372 is shown in detail in FIG. 24 and includes the same sorting controls for the behavior sub-components discussed above with respect to top-level component 344 of the daily LIFELINE view, including a sort by behavior type select menu 374, a sort by options selection menu 376, a sort by selection menu 378 and a time range view toggle 380. These controls each perform the same function as the controls described above with respect to top-level component 344.

Figure 25:
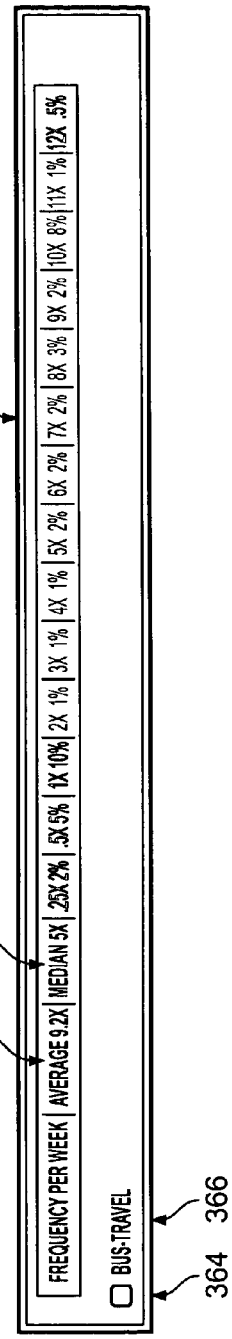
FIG. 25 is a partial screen shot showing a single behavior time-line sub-component appearing in the results/planner block component of the graphical user interface in the LIFELINE WEEKLY VIEW mode.

Behavior sub-component 382 of FIG. 9B is representative of all of the behavior sub-components in the weekly view, and, as shown in FIG. 25 includes a selection checkbox 364, a label 366 and fields, for the associated behavior, describing the average frequency per week (field 384), the median frequency per week (field 386) and the percentage frequency per week (field 388). In this view, the user can select all time boxes for the behavior for the week by selecting checkbox 364.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

What is claimed is:

1. A method for displaying search results while generating a campaign from information about available units stored in a central computer database, the information comprising a set of formats for the available units and associated ancillary information, comprising the steps of:
    entering selective criteria at a remote computer coupled to the central computer database so as to define a demographic;
    searching the central computer database based upon the entered selective criteria and identifying corresponding formats; and
    displaying the results from the search at the remote computer, the results constituting the identified corresponding formats and displayed according to the associated ancillary information, the associated ancillary information including a time period for which the corresponding formats are available and statistical information regarding behaviors of the demographic during the time period that cause the demographic to be exposed to the corresponding formats.

2. The method of claim 1, wherein the step of displaying displays the results on a timeline according to the associated time period.

3. The method of claim 2, wherein the timeline identifies results on a daily basis.

4. The method of claim 2, wherein the timeline identifies results on a weekly basis.

5. The method of claim 2, wherein the information additionally comprises a set of first characteristic data and associated behavior information and associated behavior information for the set of formats for the available units and wherein the step of entering selective criteria requires selection of criteria from the set of first characteristic data and the identified corresponding formats are identified based on the associated behavior information for the first characteristic data matching the search criteria.

6. The method of claim 5, wherein the results displayed further comprise associated statistical information for the formats, the campaign is an advertising media campaign, the available units comprise available advertising units, the first characteristic data comprises demographic information, the behavior information comprises identified behaviors performed by an advertising audience and the set of formats for the available advertising units comprise the types of advertising available.

7. The method of claim 1 further wherein the results from the search are displayed to the remote computer in selectable format such that a subset of the identified corresponding formats for each of the behaviors is selectable by the user to filter the associated ancillary information.

8. The method of claim 7 wherein the results are displayed such that the behaviors are formatted into a top level behavior component and various behavior sub-components, the top-level component providing sorting controls and header information for the various behavior sub-components.

9. The method of claim 7 further comprising saving the subset of the identified corresponding formats selected by the user as a finalized media plan.

10. The method of claim 7 wherein the results from the search are displayed to the remote computer in a sortable manner such that all the behaviors or less than all of the behaviors are selectable by the user.

11. The method of claim 10 wherein the corresponding formats are narrowed when less that all of the behaviors are selected by the users.

12. The method of claim 1 wherein the corresponding formats are displayed at the remote computer as an advertising campaign in a read-only section.

13. The method of claim 1 wherein the selective criteria is entered in a first section of a graphical user interface of the remote computer, the ancillary information is displayed in a second section of the graphical user interface and a number of behaviors hit and behavior frequencies are displayed in a third section of the graphical interface, the ancillary information being filterable and selectable in the second section to modify the number of behavior hit and behavior frequencies in the third section.

14. The method of claim 1 wherein the results displayed at the remote computer include a visual indication of a percentage of the selected demographic that is engaged in the behavior for the time period.

15. An apparatus for generating a campaign from information about available units, comprising:
    a central computer database for storing information about available units comprising a set of formats for the available units and associated ancillary information;
    a web server computer system coupled to the central computer database for searching the central computer database based upon selective criteria and for identifying corresponding formats; and
    a remote computer coupled to the web server computer system and adapted to allow entry of the selective criteria so as to define a demographic and to provide the selective criteria to the web server computer system via the network and for displaying the results from the search, the results constituting the identified corresponding formats and displayed according to the associated ancillary information, the associated ancillary information including a time period for which the corresponding formats are available and statistical information regarding behaviors of the demographic during the time period that cause the demographic to be exposed to the corresponding formats.

16. The apparatus of claim 15, wherein the results are displayed on a timeline according to the associated time period.

17. The apparatus of claim 16, wherein the timeline identifies results on a daily basis.

18. The apparatus of claim 16, wherein the timeline identifies results on a weekly basis.

19. The apparatus of claim 16, wherein the information additionally comprises a set of first characteristic data and associated behavior information and associated behavior information for the set of formats for the available units and wherein remote computer is adapted to allow selection of criteria from the set of first characteristic data and the web server computer system is adapted to identify corresponding formats based on the associated behavior information for the first characteristic data matching the search criteria.

20. The apparatus of claim 19, wherein the results displayed further comprise associated statistical information for the formats, the campaign is an advertising media campaign, the available units comprise available advertising units, the first characteristic data comprises demographic information, the behavior information comprises identified behaviors performed by an advertising audience and the set of formats for the available advertising units comprise the types of advertising available.

* * * * *